(No Model.)

G. H. F. SCHRADER.
VALVE.

No. 580,118. Patented Apr. 6, 1897.

WITNESSES:
John Becker
Fred White

INVENTOR:
George H. F. Schrader,
By his Attorneys,
Arthur E. Fraser & Co.

THE NORRIS PETERS CO., PHOTO-LITHO., WASHINGTON, D. C.

UNITED STATES PATENT OFFICE.

GEORGE H. F. SCHRADER, OF NEW YORK, N. Y.

VALVE.

SPECIFICATION forming part of Letters Patent No. 580,118, dated April 6, 1897.

Application filed November 17, 1892. Serial No. 452,281. (No model.)

*To all whom it may concern:*

Be it known that I, GEORGE H. F. SCHRADER, a citizen of the United States, residing in the city, county, and State of New York, have invented certain new and useful Improvements in Valves, of which the following is a specification.

This invention relates to valves or stoppers generally, but particularly to air-valves, and aims to provide certain improvements, which will be fully hereinafter set forth.

Figure 1:
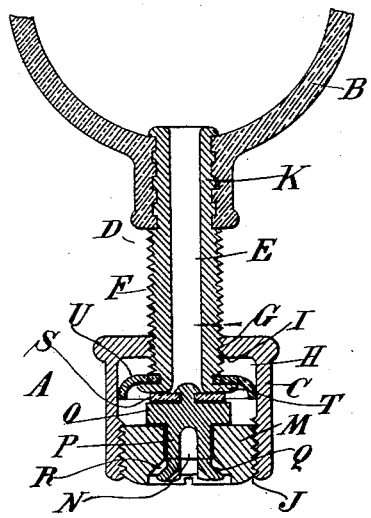
Figure 3:
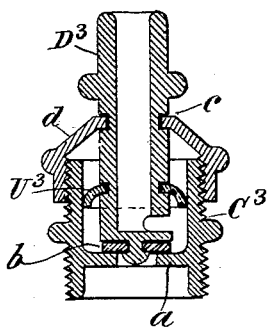
Figure 2:
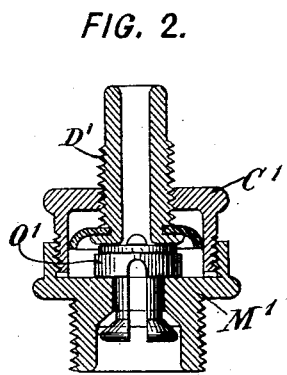
Figure 4:
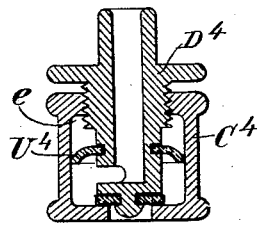
Figure 5:
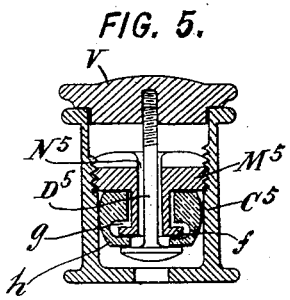

In the accompanying drawings, which illustrate several adaptations of my invention, Figure 1 is an axial mid-section of an air-valve constructed according to the preferred form of my invention. Fig. 2 is a similar view of a slightly-modified construction of valve. Fig. 3 is a similar view of a modified construction of valve. Fig. 4 shows another modification, and Fig. 5 is a similar view of another modification.

Referring to the drawings, let A represent the valve as a whole, and B an air vessel or other device to which it is applied. In the forms shown the valve is constructed of the usual two parts, relatively fixed and movable, the one constituting a stem D and the other a socket C. In the construction shown the stem enters within the socket, one of the parts being movable to open and close the valve.

In the construction shown in Fig. 1 the stem D is tubular, having internal passage E, external screw-threads F, engaging screw-threads G in the socket C, and portion K of less diameter than said thread F, on which is molded the vessel B. The stem is passed through the socket and then attached to the vessel, whereby separation of the stem and socket is prevented, although the socket can be adjusted on the stem to reach the inner end of the latter. The socket C is of inverted-cup shape, having smooth cylindrical portion H at its upper interior, flat wall I above this space and closing its top, and below the space H having internal screw-threads J. A plug M is screwed into the socket and has a conduit N, which serves as the ingress-conduit, leading to the interior of the socket. A check-valve O is disposed within the socket C between the stem D and plug M, that shown having a split tail P traversing the conduit N, constructed to permit an aperture therethrough when the check-valve is unseated, and having shoulders Q, engaging reciprocal shoulders R in the conduit to limit the upward movement of the check-valve. Thus the latter is free for slight vertical movement relatively to the plug and is free for rotary movement. On the upper face of the check-valve is a flat washer S, of packing material, secured thereto by a headed stud, which washer comes against the head T of the stem D. This head T is a flat projecting head on the end of the stem, at the face of which head the conduit E commences. Above this head is a packing-washer U, preferably cupped, surrounding the stem and seated in an annular groove to prevent its displacement, extending into contact with the cylindrical portion H of the socket C, and constituting a packing to prevent exit from within the socket outwardly around the valve-stem. This washer U when the valve is screwed to the open position is clamped between the head T and the face I of the socket, making a tight joint to prevent exit here from within the socket.

In operation the valve is brought to the closed position shown in Fig. 1 by screwing the socket up on the stem until the head T engages tightly the flat washer S of the check-valve O, thereby completely preventing exit through the duct E. The check-valve is then held against the top face of the plug M. As the valve is opened, the socket C being rotated to accomplish this, the check-valve O remains stationary until the socket has moved sufficiently from the stem to terminate contact between the washer S and the head T of the stem. Then the check-valve is free to rotate with the socket. As the socket moves farther away there is an open passage through the duct E to the interior of the socket C, from which latter exit is prevented by the check-valve O. On raising the check-valve, as by pressing upon its tail, there is a passage around it through its tail and the conduit N to or from the interior of the socket, through which conduit the vessel can be filled or emptied. To empty, the socket is screwed until the stem is out of contact with the check-valve, whereupon the outward current may escape on lifting the check-valve, passing between the washer S and the head T of the stem, and out through the conduit N. By dropping the check-valve the discharge can be stopped at any time, and the valve can then be screwed to the closed position. When the vessel is to be filled, the socket will be adjusted to bring the stem farther inwardly to such position that its head T will be out of reach of the check-valve when the shoulders Q of the latter reach the shoulders R of the plug M, so as to prevent the check-valve from acting to close the duct E. Then the incoming current can pass inwardly around the check-valve through the duct E to the vessel B. When the inner pressure exceeds the force of the incoming current, the check-valve will move against the plug, thereby preventing escape. Thus no loss of pressure will result if the incoming force diminishes.

By constructing the washer S to remain stationary relatively to the stem when in contact therewith twisting of the washer as the valve is operated is prevented.

The construction shown in Fig. 2 closely resembles that described with reference to Fig. 1 in all details of construction of the parts. The stem (here lettered D') is here the ingress member, and the part which rotates and the socket (here lettered C') is stationary and is the egress member, to which will be attached the vessel to be filled. The plug (here lettered M') engages the exterior of the socket, and the check-valve (here lettered O') is constructed to always permit a passage to the interior of the socket. The stem here operates through the top of the socket, as before, the other internal parts being identical to those just described.

Fig. 3 shows another modification. In this construction the valve-stem (lettered $D^3$) enters the socket (lettered $C^3$) and carries the cupped washer, (lettered $U^3$,) which makes a tight joint between the stem and interior of the socket. The conduit traverses the stem, opening beneath the cupped washer into the socket. Within the socket is a valve-seat $a$, and on the end of the stem is a washer $b$, which when the stem is forced downwardly acts against the seat $a$ to close the valve. The stem is constructed with an annular groove $c$, engaged by a thimble $d$, which in turn screws over the exterior of the socket, and being swiveled to the stem by having its top edge swaged into the groove $c$ permits the adjustment of the stem by the rotation of the thimble without the necessity of rotating the stem itself, whereby distortion of the washer $b$ is prevented. In this construction the thimble is rotated to remove the valve from its seat, whereupon a conduit exists through the valve. The cupped washer prevents escape around the stem. When the valve is closed, the stem is driven down tight by the counter-rotation of the thimble until the seat $a$ and washer $b$ are in tight contact, whereby escape is prevented.

The construction in Fig. 4 shows a valve where the stem (here lettered $D^4$) screws into the socket, (here lettered $C^4$,) carries the cupped washer, (here lettered $U^4$,) which engages the interior of the socket to prevent exit around the stem. In this construction the socket has a shoulder $e$ at top, against which the cupped washer abuts to prevent separation of the stem and socket when the valve is completely open, the parts being disposed, however, to permit such separation if sufficient force to that end is exerted to overcome the resistance of the cupped washer, the latter in this case serving the two functions of a flexible catch to prevent separation of the stem and socket and a cupped packing to prevent leakage around the stem.

The construction shown in Fig. 5 consists of a socket $C^5$, within which is screwed a plug $M^5$, having a central duct traversing it and constituting the egress-passage $N^5$, and constructed on its inner end with a head $f$, constituting a valve-seat, back of which is an annular groove $g$. A long rubber plug $h$, normally loosely fitting the interior of the socket and conforming internally substantially to the shape of the head $f$, is sprung over the latter, covering its sides and the bottom face of the head. A valve-stem $D^5$, screw-threaded at its upper end and headed at its lower end, passes upwardly through the plug and is engaged at top by a cap V, which fits within the top of the socket to close the latter. The head of the stem engages the lower end of the rubber plug $h$, and when the stem is raised clamps this end of the rubber against the head $f$, thereby entirely closing communication between the interior of the socket and the conduit through the plug $M^5$, thus closing the valve. At the same time the stem when thus grasping the rubber distends the body of the rubber plug $h$ in the manner shown in Fig. 5, thus forcing it into intimate contact with the side walls of the socket to prevent exit along such side walls and insure a tight closure. To open this valve, the cap V is removed, whereupon the stem falls away from contact with the rubber plug, thus permitting ingress or egress, as desired.

It will be seen that my invention provides an improved valve, simple in construction and effective in operation, and that the invention is not limited to the particular adaptations set forth, as it may be availed of in whole or in part according to such modifications as circumstances may dictate.

What I claim is, in valves, the following-defined novel features and combinations, substantially as hereinbefore set forth, namely:

1. In a valve or stopper, a socket and a stem, the one movable relatively to the other, and one having a seat and the other a valve proper closing thereon when said parts are relatively moved in one direction, and opening therefrom when said parts are moved in another direction, in combination with a check-valve carried by one of said parts, movable relatively to said parts when they are in the open position, and when then moved in one direction closing communication through the valve, and when moved in another direction opening such communication.

2. In a valve or stopper, a socket and a stem, the one movable relatively to the other and one having a seat, in combination with a valve proper between said parts, a separate member carrying said valve proper, rotatively connected to one of said parts, and movable independently of both of said parts toward and from said seat when said parts are in the open position, and clamped by said parts against said seat when said parts are in the closed position, whereby said valve proper acts both as an ordinary and a check valve.

3. In a valve or stopper, the combination of a socket and a stem, the one rotative and axially movable relatively to the other, the stem having a valve-seat at right angles to its axis, and the socket having a rotative valve proper engaging said seat, a packing-washer carried by one of said parts, movably engaging and sliding axially along the other of said parts, during their rotative and axial movement, engaging both of said parts at points remote from said seat, and thereby preventing leakage between said parts during their rotative movement, said parts having opposing shoulders at opposite sides of said washer engaging its opposite faces as said shoulders approach and thereby clamping it between these and preventing leakage, substantially as and for the purpose set forth.

4. In a valve or stopper the socket C, the plug M therein, the check-valve O carried thereby, the stem D, and the washer U, combined and arranged substantially as and for the purpose set forth.

5. In a valve or stopper, a socket and a valve-stem, the socket having an internal annular shoulder and the stem having an external annular shoulder opposed to that of the socket, and an annular washer U moving with and carried by the stem between its shoulder and that of the socket, and engaging the latter shoulder as said parts are separated, and resisting their separation, and said washer preventing leakage between said socket and stem.

6. In a valve or stopper, a socket and stem, one of said parts having an annular valve-seat, one of said parts having a tubular portion having a duct, and one of said parts having a valve proper acting against said seat to close the valve, said socket having a valve-chamber within which said seat and valve proper are disposed, and said tubular part having an external annular groove beyond said seat and within said chamber, in combination with an annular packing-washer seated in said groove, projecting laterally therefrom, engaging the adjacent wall of said chamber, and preventing leakage past itself, substantially as and for the purpose set forth.

In witness whereof I have hereunto signed my name in the presence of two subscribing witnesses.

GEORGE H. F. SCHRADER.

Witnesses:
GEORGE H. FRASER,
CHARLES K. FRASER.